United States Patent
Troll (10) Patent No.: US 6,757,459 B2
(45) Date of Patent: Jun. 29, 2004

(54) PIEZOELECTRICALLY DRIVEN, LIQUID-ACTUATED OPTICAL CROSS-BAR SWITCH

(75) Inventor: Mark Troll, Seattle, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 449 days.

(21) Appl. No.: 10/036,883

(22) Filed: Oct. 24, 2001

(65) Prior Publication Data
US 2003/0077023 A1 Apr. 24, 2003

(51) Int. Cl.$^7$ .................................................. G02B 6/42
(52) U.S. Cl. .............................. 385/18; 385/16; 385/17
(58) Field of Search ........................... 385/7, 14, 16–19

(56) References Cited

U.S. PATENT DOCUMENTS

| 4,988,157 A | 1/1991 | Jackel et al. |
| 5,510,819 A | 4/1996 | Fujimoto et al. |
| 5,699,462 A | 12/1997 | Fouquet et al. |

FOREIGN PATENT DOCUMENTS

| DE | 195 27566 | 7/1995 |
| DE | 199 10375 | 3/1999 |
| EP | 1 014 140 | 6/2000 |
| EP | 1 111 419 | 6/2002 |

Primary Examiner—Phan T. H. Palmer (57) ABSTRACT

A system for manipulating optical signals in an optical switch utilizes a piezoelectric membrane. The membrane is selectively enabled to switch among an outward position, an inward position and a relaxed orientation in relation to a sidewall of a trench that is provided as part of the switch. The membrane is in fluidic communication with an intersecting gap of the trench that crosses a first input waveguide and a first output waveguide. Displacing the membrane to a first position causes the gap to be filled with an index-matching liquid such that light from the first input waveguide is transmitted to the first output waveguide. Alternatively, displacing the membrane to a second position causes the gap to be filled with a gaseous bubble, resulting in a refractive index mismatch, such that the light from the first input waveguide is diverted at the gap. In another embodiment, there are two membranes utilized for manipulating optical signals.

27 Claims, 11 Drawing Sheets

PIEZOELECTRICALLY DRIVEN, LIQUID-ACTUATED OPTICAL CROSS-BAR SWITCH

TECHNICAL FIELD

The invention relates generally to optical switching elements and more particularly to a system and method for manipulating optical signals by operations within an optical switch.

BACKGROUND ART

Optical signals can be selectively rerouted by optical switches used in both telecommunication systems and data communication systems. In circuit switching, any one fiber in an array of parallel input optical fibers may be connected to any one fiber in an array of output optical fibers using a matrix of optical switches. As a result, an incoming data packet from a particular input fiber can be directed to a selected output fiber, based upon the destination of the packet.

U.S. Pat. No. 4,988,157 to Jackel et al. describes a bi-stable optical switching arrangement utilizing electrochemically generated bubbles. Parallel input waveguides and parallel output waveguides are formed on a substrate at perpendicular angles so as to intersect. A 45 degree slot is formed across each intersection. The slots are selectively filled with a fluid, such as water or a refractive index-matching fluid. Electrodes are positioned adjacent to the slots and are selectively activated to electrolytically convert the fluid to gaseous bubbles. The electrolytic formation of the bubbles destroys any index-matching properties across the slots and causes light to be reflected at the slot sidewall. Thus, an electrolytically formed bubble within a particular slot results in the reflection of optical signals at the slot, rather than the propagation across the slot. The presence of either a catalyst, an electrical pulse of opposite polarity, or an electrical pulse of significant size and of the same polarity will collapse the bubble, thereby returning the switch to a transmissive state.

Although the approach taken by Jackel et al. is simple and potentially inexpensive in large quantities, and achieves a number of advantages over prior approaches, further improvements may be realized. Where water is used as the fluid, electrolysis generates $H_2$ and $O_2$ bubbles in order to create a reflecting state, but the water provides a poor index match to the waveguides when the switch is returned to the transmissive state. Consequently, crosstalk is high if water is used. Another concern is that the bubble-creation process and the bubble-removal process may be too slow to meet the desired transition time for telecommunication switching.

U.S. Pat. No. 5,699,462 to Fouquet et al. provides a more promising approach. The switching arrangement of Fouquet et al. utilizes electrically driven heaters as a means for controlling the direction of the optical signals transversing the switch. Intersecting input waveguides and output waveguides are formed on a silicon substrate. In the transmissive state, an index-matching fluid fills the intersection, enabling light to continue in the input waveguide direction. To initiate switching from the transmissive to the reflective state, a heater is selectively energized to form a bubble within the intersection between the input and output waveguides. The formation of a bubble destroys any index-matching properties across the intersection, resulting in the reflection of optical signals away from the input waveguide direction. A concern with the heater approach is that there is a loss of heat to the surrounding silicon substrate, which necessarily increases the power requirement to create and hold the bubble in place. Another concern is that there may be significant "thermal crosstalk" among switches on a single silicon substrate as the temperature in the surrounding silicon substrate is elevated by heating at one of the switches.

What is needed is a switching element and an arrangement which enable reliable and repeated transitions between transmissive and reflective states, thereby controlling optical communication between optical signal lines.

SUMMARY OF THE INVENTION

The invention is a system and method for controlling optical signals in an optical switch using a piezoelectric actuator. The optical switch comprises: (1) a first input waveguide and a first output waveguide with ends at an intersecting gap, (2) a trench having walls for accommodating a fluid, wherein the trench includes the gap, and (3) the piezoelectric actuator positioned along a wall of the trench. In response to an input voltage, a movable membrane of the actuator in the preferred embodiment is configured to switch between an outward position and an inward position in relation to the interior of the trench. In other embodiments, the movable membrane is configured to switch among an outward position, an inward position and a relaxed position in relation to the interior of the trench. The membrane is positioned relative to the gap such that the displacement of the membrane to one of the selected positions results in the manipulation of the fluid disposed within the gap. In one position, the gap is filled with an index-matching liquid that causes light from the first input waveguide to transmit through the gap and into the first output waveguide. In another position, the gap is filled with a gaseous bubble that creates a refractive index mismatch that causes light from the first input waveguide to be diverted at the gap. Preferably, the diversion is in a direction of a second output waveguide. In another embodiment, there are two piezoelectric actuators for manipulating the fluid disposed within the gap. The two actuators are positioned relative to the gap to devise a "push-pull" configuration.

The movable membrane may include a stress-biased lead zirconia titanate (PZT) material for converting electrical fields into mechanical displacements. Utilizing a PZT material for deflection is preferred due to its high range of mechanical deflection per unit of electrical energy input. Other materials with similar piezoelectric properties may also be used.

The piezoelectric actuator includes a first electrode and a second electrode coupled to a voltage source. Each of the electrodes is in contact with the membrane and with the voltage source. In one embodiment, the electrical connection to the first electrode is provided on the side of the membrane opposite to the electrical connection to the second electrode. In another embodiment, the two electrical connections are provided on a same side of the membrane.

In the preferred embodiment, the movable membrane is displaced from a relaxed position to a first position that is either the inward position or the outward position in response to an input voltage. In the inward position, the membrane is in a convex orientation in relation to the wall of the trench, such that the index-matching liquid disposed within the trench is displaced in a direction away from the membrane. Alternatively, in the outward position, the membrane is in a concave orientation in relation to the trench wall such that the index-matching liquid disposed within the trench is enabled to flow in a direction toward a cavity created by the orientation. An input voltage of opposite polarity displaces the membrane to a second position that is opposite from the first position. Maintaining the membrane in one of the two positions requires a continuous voltage input, but the level of input may be reduced. While not critical, an input voltage may displace the membrane from the first or second position to the relaxed position. In other embodiments, the movable membrane is displaced from a first position that is a convex or a concave orientation to a second respective position that is more convex or concave.

At least one gaseous bubble is provided within the liquid-filled trench. An acceptable means for forming the bubble includes degassing a dissolved inert gas contained within the index-matching liquid. Other bubble forming techniques may also be used. Utilizing an inert gas, or a mixture of inert gases, is preferred due to its non-reactive properties with the index-matching liquid. Acceptable inert gases include nitrogen, xenon, krypton, argon, neon, helium, carbon dioxide, sulfur hexafluoride, and the like.

In one embodiment in which there is one movable membrane, a first bubble and a second bubble are provided within the liquid-filled trench. In the convex orientation, the first bubble that is near the membrane is displaced into the intersecting gap to create a refractive index mismatch, resulting in the diversion of the optical signals from the direction of the first input waveguide, so that the signals do not reach the first output waveguide. Preferably, the diversion is in the direction of the second output waveguide. Moreover, since the volume within the trench is reduced by an amount of displacement by the membrane, the first and second bubbles are compressed.

Switching the membrane to the concave orientation allows an expansion of the volume within the trench by an amount of displacement by the membrane, resulting in pressure relief to the compressed bubbles. The compressed second bubble that is farthest away from the membrane functions as a "mechanical spring" to "push" the index-matching liquid immediately adjacent to the second bubble in a direction toward the membrane, resulting in the displacements of the liquid into the gap and the first bubble away from the gap to allow the propagation of the optical signals from the first input waveguide to the first output waveguide. The exact locations of the bubbles and the index-matching fluid when the membrane is in a selected orientation is not meant to be limiting. That is, the bubbles and the liquid can be in different locations when the membrane is in the same orientation without diverging from the scope of the invention.

In another embodiment in which there are two movable membranes on opposite sides of the intersecting gap, one bubble is provided within the liquid-filled trench. The two membranes are configured to be in opposing orientations such that the bubble is displaced away from the gap when the first membrane is in a first orientation (e.g., concave orientation) and the second membrane is in a second orientation (e.g., convex orientation). Likewise, the bubble is displaced into the gap when the first membrane is in the second orientation (e.g., convex orientation) and the second membrane is in the first orientation (e.g., concave orientation).

While the invention is described as utilizing a membrane for manipulating the index-matching liquid within the gap, other types of actuators, such as a piston, can be used without diverging from the scope of the invention. Moreover, the trench may include a geometric constriction for holding the bubble at a fixed location within the trench once the bubble is displaced into that location by the movement of the membrane. In this arrangement, the level of the input voltage to maintain the bubble at a particular location within the trench may be lessened. Alternatively, the trench is tapered at one end, such that the cross-sectional area at one end is smaller than the cross-sectional area at the other end.

One of the advantages of utilizing piezoelectric actuator(s) in an optical switch is that the power requirements for switching between different orientations and for holding the membrane in place are kept low. Another advantage is that very little heat is dissipated to the surrounding structure, due to the low power consumption by the actuator(s). Consequently, thermal crosstalk among switches is reduced. Other embodiments include different advantages in addition to those described above.

DETAILED DESCRIPTION

Figure 1:
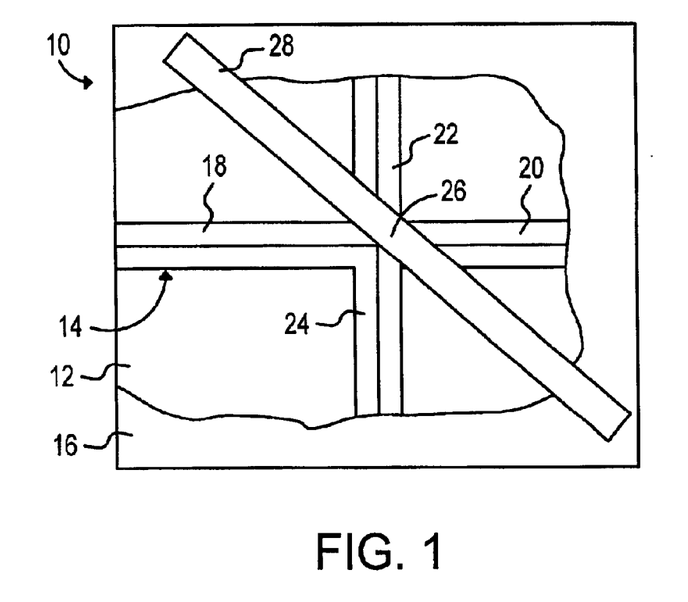
FIG. 1 is a top view of an optical switch in accordance with the invention that utilizes total internal reflection for reflecting optical signals from a first input waveguide to a second output waveguide.

FIG. 1 shows an optical switch 10 formed on a substrate. The substrate may be a silicon substrate. The optical switch includes planar optical waveguides defined by a lower cladding layer 12, a core 14 and an upper cladding layer 16. During fabrication, a core layer of material is deposited and etched on the lower cladding layer to form the waveguides. A first input waveguide segment 18 is aligned for transmission to a first output waveguide segment 20, while a second input waveguide segment 22 is aligned for transmission to a second output waveguide segment 24. The axes of the waveguide segments 18 and 24 intersect at a sidewall of an intersecting gap 26.

The core 14 of the waveguide segments 18–24 is formed of a material that is primarily $SiO_2$, but which includes another material, such as Ge or $TiO_2$. In alternative embodiments, other materials with similar properties are used. The cladding layers 12 and 16 may be formed of a material that is primarily $SiO_2$, but which includes other materials that have a different refractive index from that of the core, such as $B_2O_3$ and/or $P_2O_5$. Because the core material has a refractive index that is different from the refractive index of the cladding layers, optical signals will be guided along the optical waveguide segments 18–24.

A trench 28 etched through the waveguide segments 18–24 at their intersection forms the intersecting gap 26. The waveguide segments intersect the trench at an angle of incidence greater than the critical angle for total internal reflection (TIR) when the trench is filled with a gas. As a result, TIR diverts light from the first input segment 18 to the second output segment 24, unless an index-matching material is located within the intersecting gap between the aligned first input segment 18 and first output segment 20. The trench is ideally positioned such that TIR signals are maximally coupled into the receiving output segments. As a result, optical signals can be deflected between the segments (e.g., segment 18 to 24) with minimal loss.

Figure 2:
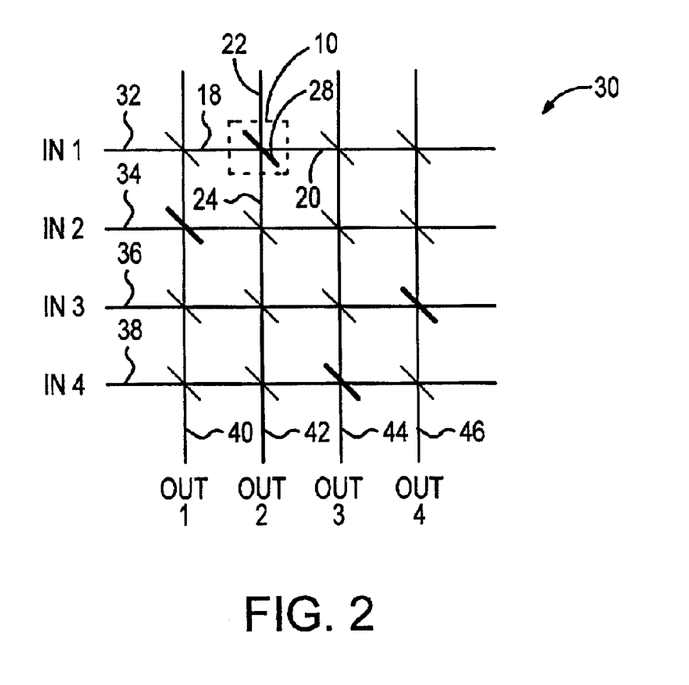
FIG. 2 is an exemplary matrix of optical switches of FIG. 1 that allows selective coupling between a linear array of input waveguides and a linear array of output waveguides.

FIG. 2 shows an exemplary 4×4 matrix 30 of optical switches. In this arrangement, any one of the four input waveguides 32, 34, 36 and 38 may be connected to any one of the four output waveguides 40, 42, 44 and 46. Thus, the switching arrangement is a non-blocking optical crossconnect switching matrix for telecommunications or data communications. Each of the sixteen optical switches defined by the four input waveguides and the four output waveguides has a trench that induces TIR in the absence of an index-matching liquid, since the angle of the trench relative to an input waveguide is selected to cause TIR from an input waveguide to a selected output waveguide. However, if the trench between collinear sections of one of the waveguides is filled with an index-matching liquid, the switch is in the transmitting state. Liquid-filled trenches are represented by fine lines (e.g., a trench defined by input waveguide 32 and output waveguide 40) that extend at an angle through intersections of optical waveguides in the array. On the other hand, trenches having an absence of index-matching liquid are represented by broad lines (e.g., a trench defined by input waveguide 32 and output waveguide 42) through a point of intersection.

With reference to FIGS. 1 and 2, the input segment 18 is in optical communication with the output segment 24 as a result of reflection at the empty trench 28. Since all other crosspoints for allowing the input waveguide 32 to communicate with the output waveguide 42 are in a transmissive state, a signal that is received at the input waveguide 32 will be transferred to the output waveguide 42. In like manner, the second input waveguide 34 is optically coupled to the first output waveguide 40, the third input waveguide 36 is optically coupled to the fourth output waveguide 46, and the fourth input waveguide 38 is optically coupled to the third output waveguide 44.

While FIG. 2 shows the input waveguides 32–38 as intersecting respective output waveguides 40–46 at 90° angles, with 45° incidence angles at the trenches, other angles are possible. For the most efficient operation, the angle of incidence of all optical signals in the input waveguide to the trench should be large enough for TIR.

In addition to the diversion approach of FIG. 1, the invention may be utilized in a modulator. That is, if the second waveguide of segments 22 and 24 is deleted, so that only the first waveguide of segments 18 and 20 remains, the presence or absence of index-matching liquid within the intersecting gap 26 of the trench 28 will determine whether a signal from the input segment 18 will be transmitted to the output segment 20. In the absence of the index-matching liquid, the signal is diverted, but it is not diverted to the output segment 24.

Figure 3:
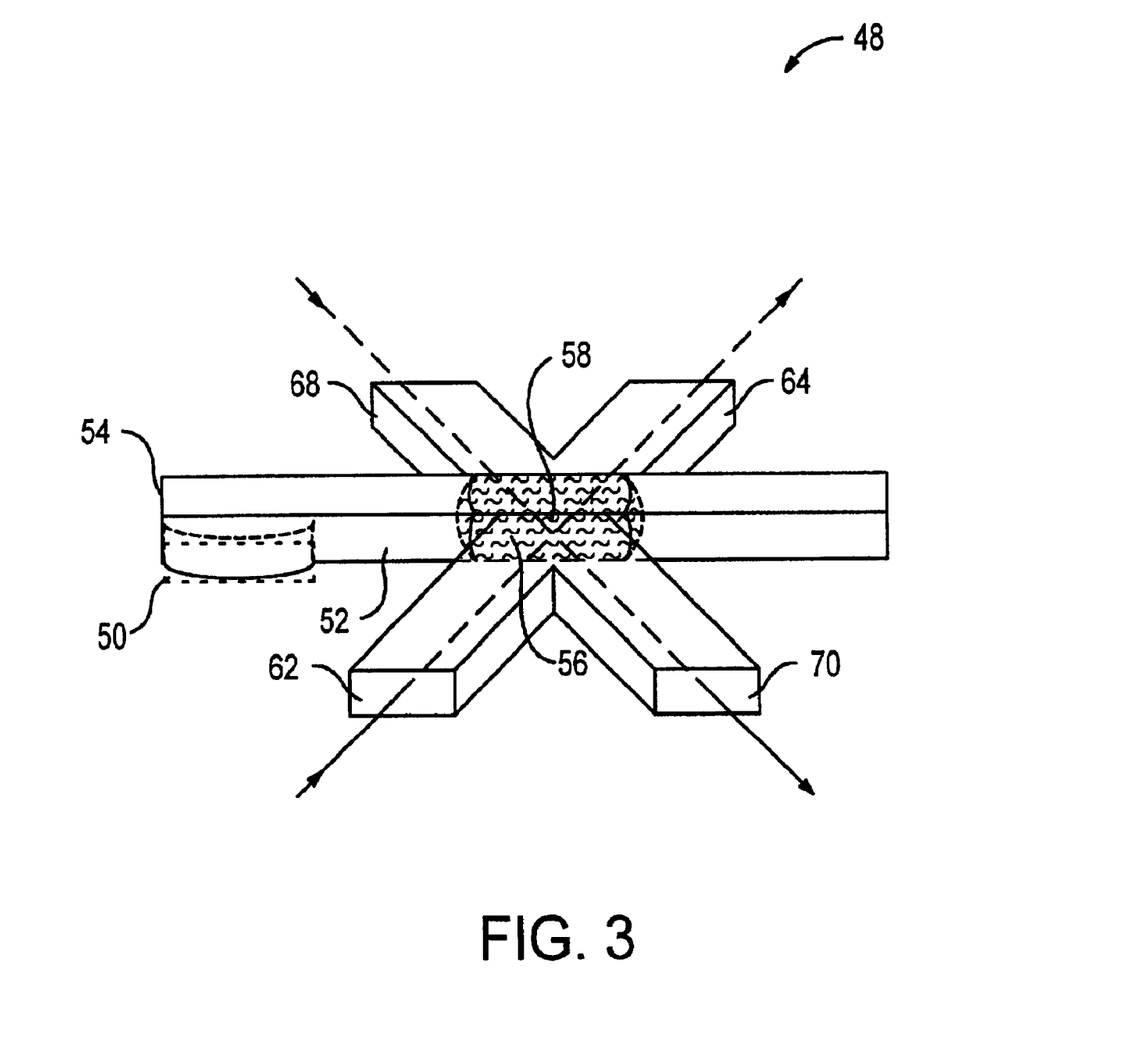
FIG. 3 is a perspective view of an optical switch having a piezoelectric actuator positioned along a sidewall in accordance with the invention.

A piezoelectric actuator for manipulating optical signals is included within the optical switch. FIG. 3 shows a perspective view of an optical switch 48 having a piezoelectric actuator 50 positioned along a sidewall 52 of a trench 54. In the illustrated embodiment, the "sidewall" is the bottom wall of the trench. The piezoelectric actuator is shown as a dashed block to illustrate its range of mechanical displacement for manipulating an index-matching liquid 56 disposed within the trench. The displacement selectively switches the actuator between an outward position and an inward position in relation to the sidewall of the trench. The actuator is positioned to control fluidic communication with an intersecting gap 58. The gap separates a first input waveguide segment 62 and a first output waveguide segment 64, as well as a second input waveguide segment 68 and a second output waveguide segment 70. As shown in FIG. 3, optical signals received by the first input waveguide segment are transmitted to the first output waveguide segment and optical signals received by the second input waveguide segment are transmitted to the second output waveguide segment when the index-matching liquid is disposed within the gap. While not shown, optical signals received by the first input waveguide segment are diverted to the second output waveguide segment when the index-matching liquid is displaced away from the gap.

Figure 4:
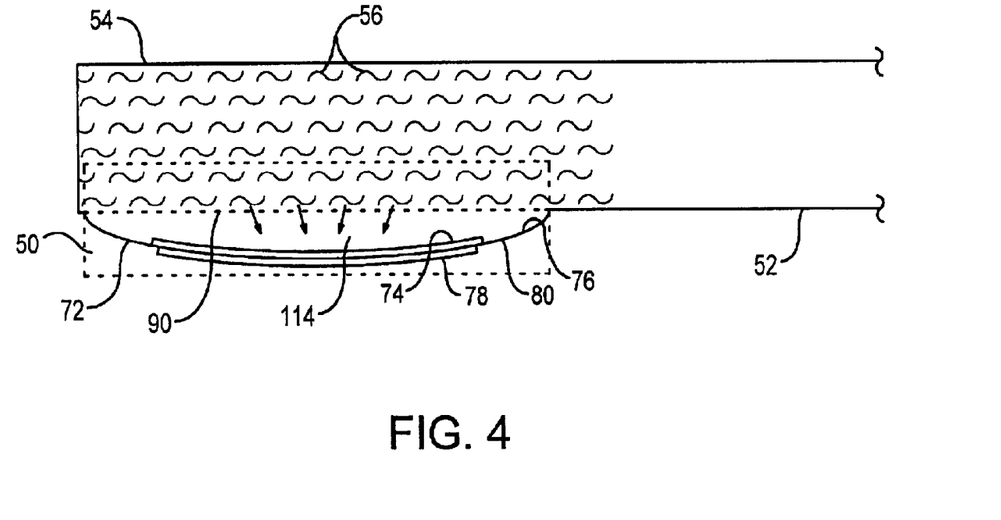
FIG. 4 is an enlarged cross-sectional view of the piezoelectric actuator of FIG. 3 in an outward position.

FIG. 4 shows an enlarged cross-sectional view of the piezoelectric actuator 50 of FIG. 3 in relation to the sidewall 52 of the trench 54. The piezoelectric actuator includes a movable membrane 72. Preferably, the membrane includes a stress-biased lead zirconia titanate (PZT) material for converting electrical fields into mechanical displacements. Membranes utilizing a PZT material for mechanical displacements are particularly advantageous, since the PZT material exhibits a very high electrical energy to mechanical energy coupling factor k. That is, the PZT material offers a very high range of mechanical deflection per unit of electrical energy input. Moreover, the PZT material is highly stable relative to other materials and exhibits low hysteresis over extended uses. While the PZT material is the most preferred, other materials with piezoelectric properties may also be used.

A first electrode 74 is operationally coupled to a first surface 76 of the movable membrane 72 for transmitting an electric current from a voltage source (not shown) to the membrane. Likewise, a second electrode 78 is operationally coupled to a second surface 80 of the membrane and the voltage source. The first surface and the second surface are on opposing sides of the membrane. The electrodes may include titanium, platinum, or other metallic elements particularly suited for conducting an electric current.

Figure 5A:
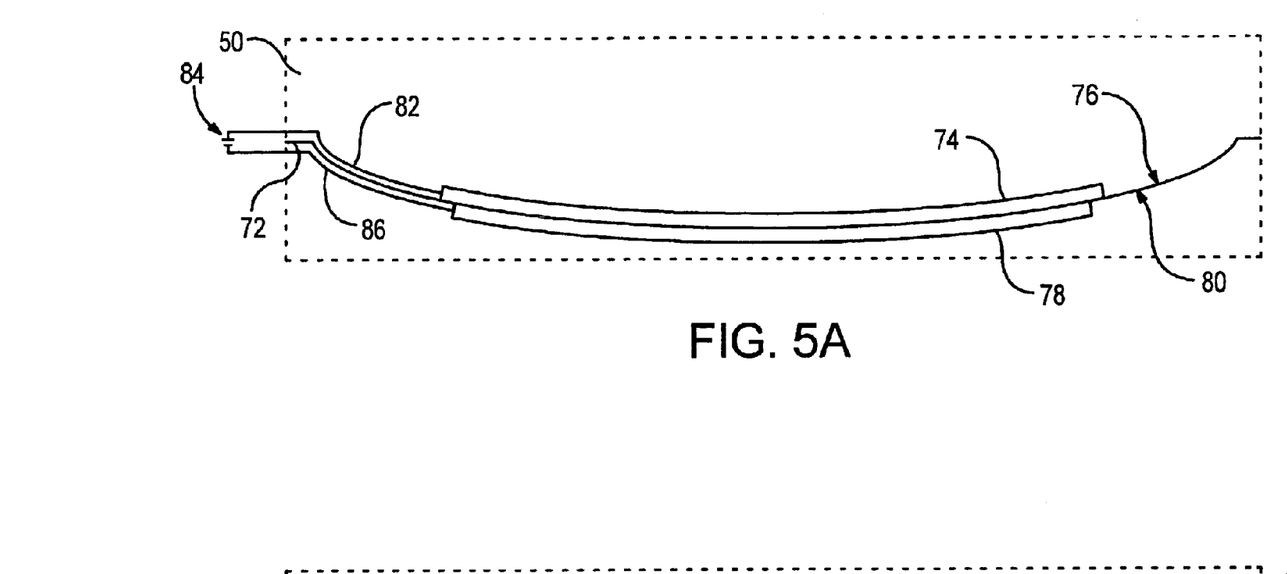
FIG. 5A is a side view of the piezoelectric actuator of FIG. 4 in which the electrical connections are on an opposing sides of the membrane.

The electrical connections for the first and second electrodes to the voltage source can be on opposite sides or on a same side of the movable membrane. In one embodiment, FIG. 5A shows an enlarged view of the piezoelectric actuator 50 of FIG. 4 in which the electrical connections that provide current to the electrodes 74 or 78 are on opposite sides of the membrane 72. A first electrical connection 82 is coupled to the first electrode 74 and is directed to a voltage source 84 on a same side as the first electrode. Similarly, a second electrical connection 86 is coupled to the second electrode 78 and is directed to the voltage source on a same side as the second electrode. Each electrical connection is provided as part of the optical switch during fabrication.

Figure 5B:
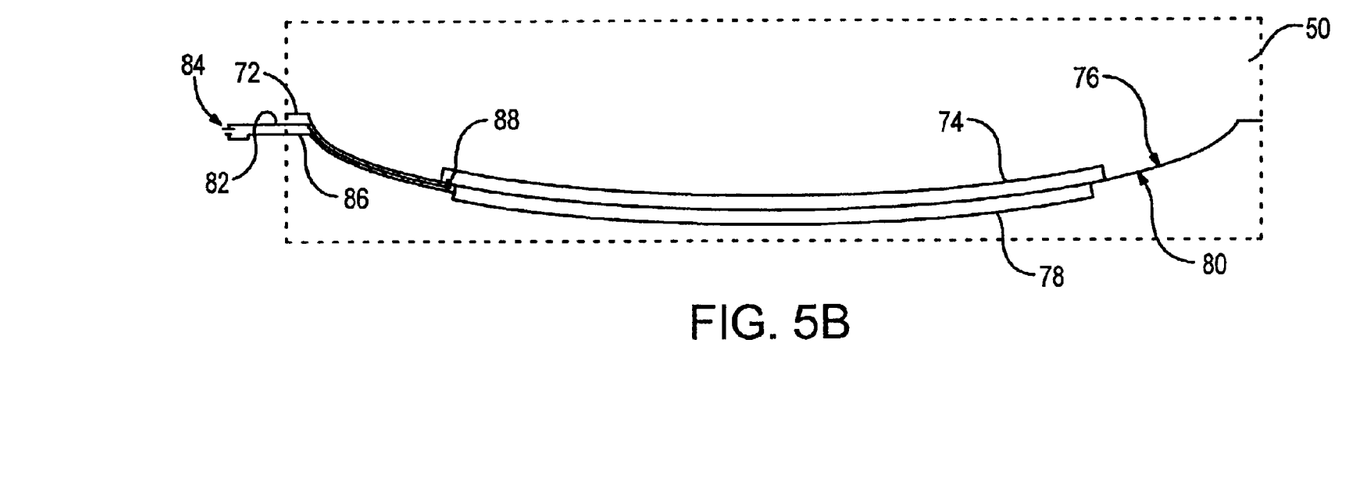
FIG. 5B is a side view of piezoelectric actuator of FIG. 4 in which both electrical connections are provided on the same side of the membrane.

In another embodiment, FIG. 5B shows an enlarged view of the piezoelectric actuator 50 of FIG. 4 in which the first electrical connection 82 is provided on the same side as the second electrical connection 86. A conductor 88 is shown as a transmitting means for conducting current between the first electrical connection 82 and the first electrode 74. The conductor is shown as penetrating the membrane 72 to provide current to the first electrode. Alternatively, the conductor can be provided at a sidewall of the trench for making the connection between the first electrical connection and the first electrode. In this arrangement, an additional electrical attachment (not shown) is provided to transmit current between the conductor and the first electrode.

In operation, a closed loop is formed between the voltage source 84, the first electrical connection 82, the conductor 88 (in accordance with one embodiment), the first electrode 74, the movable membrane 72, the second electrode 78, and the second electrical connection 86. Depending on the polarity, a voltage input displaces the membrane to a first position that is either an outward or an inward position. A voltage input of opposite polarity displaces the membrane to a second position that is opposite of the first position. Alternatively, a different voltage input may displace the membrane from the first or second position to a relaxed position.

Figure 6:
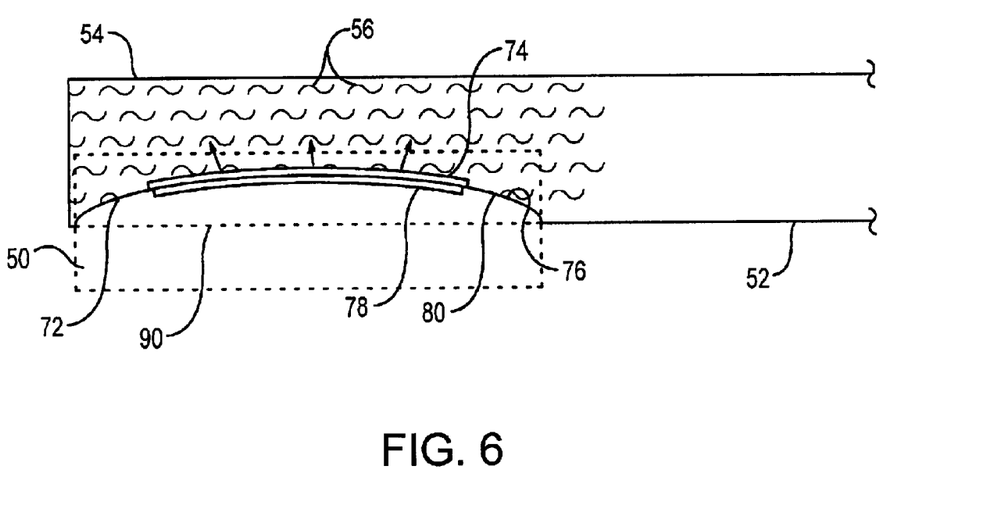
FIG. 6 is a side cross-sectional view of the piezoelectric actuator of FIG. 3 in an inward position.

Returning to FIG. 4, the movable membrane 72 is displaced from the relaxed position to a first position that is either the outward position or the inward position in response to an input voltage. The relaxed position is one in which the location of the membrane is horizontally aligned with an imaginary surface that extends along the sidewall 52. The imaginary surface is indicated by a dashed line 90. As shown in FIG. 4, the membrane is in a concave orientation in relation to the imaginary surface while in the outward position. FIG. 6 shows the membrane is in a convex orientation in relation to the imaginary surface while in the inward orientation.

In an exemplary embodiment, a PZT membrane having a planar surface area of about 450 $\mu$m×450 $\mu$m has an average deflection of approximately 0.1 $\mu$m in a direction normal to the planar surface at an energy input of 11 Volts. An energy input of opposite polarity displaces the membrane in an opposite direction along the normal. Once displaced, the membrane can be maintained in position with a smaller input current to the electrode. Moreover, the deflected volume of about 20,000 cubic $\mu$m (450 $\mu$m×450 $\mu$m×0.1 $\mu$m) along the normal in a concave orientation or a convex orientation is sufficient to displace the index-matching liquid 56 in a trench having a cross-sectional area of 28 $\mu$m×13 $\mu$m of approximately 55 $\mu$m in the linear direction along the trench.

Figure 7:
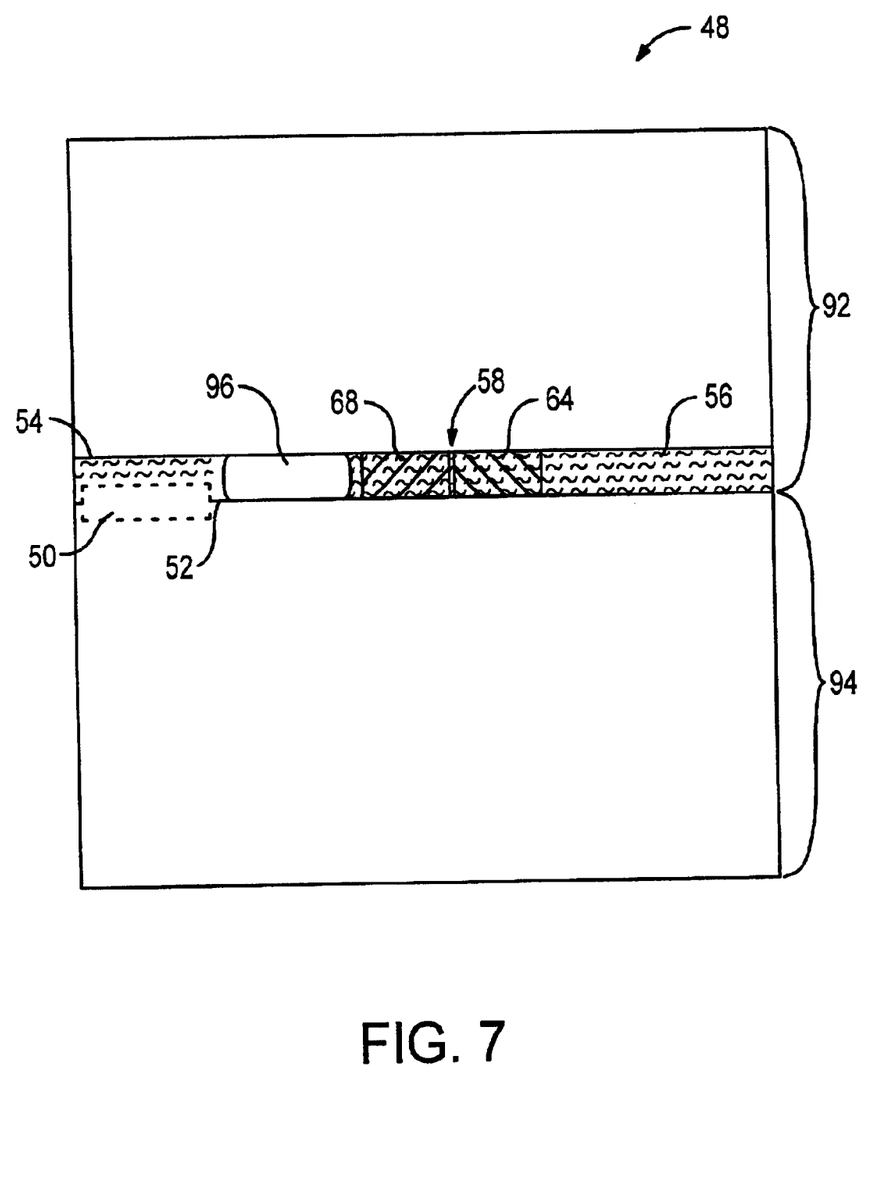
FIG. 7 is a cross-sectional view of the optical switch of FIG. 3 with a waveguide substrate and a piezoelectric actuator substrate.

The fabrication of the switching elements preferably includes bonding a waveguide structure to a piezoelectric structure. FIG. 7 shows a cross-sectional view of the optical switch 48 of FIG. 3 with a waveguide substrate 92 and a piezoelectric actuator substrate 94. The sectional cut of the waveguide substrate extends along the trench 54 and through the input waveguide segment 68 and the output waveguide segment 64. The waveguide segments are shown by hatching. The trench is fabricated on the waveguide substrate such that the intersecting gap 58 of the trench crosses the waveguide segments. The trench is filled with the index-matching fluid 56, other than at a bubble region 96. The piezoelectric substrate includes the piezoelectric actuator 50. The two substrates are bonded together in an arrangement in which the sidewall 52 that includes the piezoelectric actuator forms a closure to the trench.

Although the invention is described as including the piezoelectric actuator 50 as part of the actuator substrate 94, the actuator can be formed as part of the trench 54 in the waveguide substrate 92, provided that the actuator is in fluidic communication with the intersecting gap 58. Alternatively, the actuator may be formed at an end of the trench. While the location in one arrangement may offer some advantages over a different arrangement, that determination is made upon various factors, such as a desired range of linear displacement of the index-matching liquid 56 along the trench offered by the mechanical displacement of the movable membrane per unit energy input.

At least one gaseous bubble 96 is provided as part of the liquid-filled trench 54. One conventional technique for forming the bubble involves degassing a dissolved gas contained within the index-matching liquid 56. The gas is dissolved into the liquid at a temperature that is below an operational temperature of the optical switch. Subsequent to the step of dissolving, the temperature is raised to the operational temperature that may be room temperature. The rise in temperature degasses the dissolved gas from the liquid to form the gaseous bubble. Preferably, the gas is an inert gas, or a mixture of inert gases, that includes properties which are generally non-responsive to the index-matching liquid. Acceptable inert gases include nitrogen, xenon, krypton, argon, neon, helium, carbon dioxide, and sulfur hexafluoride. Other bubble forming techniques may also be used.

Figure 8:
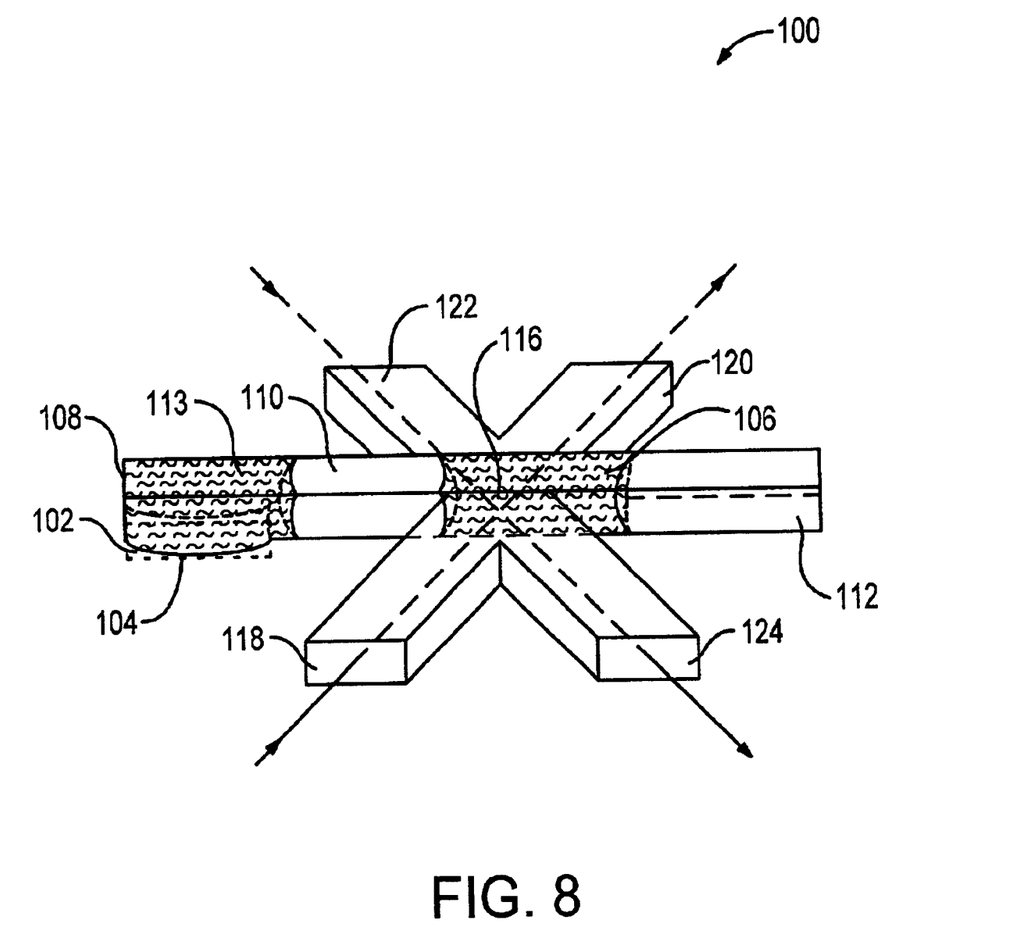
FIG. 8 is a perspective view of an optical switch of FIG. 3 in which the movable membrane is shown in a concave orientation.

With reference to FIG. 8, an optical switch 100 in accordance with a first embodiment of the invention is shown. The optical switch includes a piezoelectric actuator 102 having a movable membrane 104 for switching between a concave orientation and a convex orientation to manipulate an index-matching liquid 106 disposed within a liquid-filled trench 108. Alternatively, the membrane is configured to switch among a concave orientation, a convex orientation and a relaxed orientation to manipulate the liquid. In other embodiments, the membrane is configured to be displaced from a convex or a concave orientation to a different orientation that is respectively more convex or more concave. A first bubble 110 and a second bubble 112 are included within the liquid disposed within the trench. In a concave orientation of the membrane, the portion 113 of the liquid that is near the membrane is enabled to flow in a direction toward a cavity created by the displacement. FIG. 4 shows the membrane 72 in the similar concave orientation in which the liquid 56 that is near the membrane is enabled to flow in a direction toward a cavity 114.

In FIG. 8, the displacement of the liquid 113 into the additional volume created by movement of the membrane 104 into the concave orientation draws the first bubble 110, the liquid 106 and the second bubble 112 in a direction toward the membrane. During the displacement, the liquid 106 is displaced into the intersecting gap 116. Optical signals received by a first input waveguide segment 118 are transmitted to a first output waveguide segment 120. Similarly, optical signals received by a second input waveguide segment 122 are transmitted to a second output waveguide segment 124.

Figure 9:
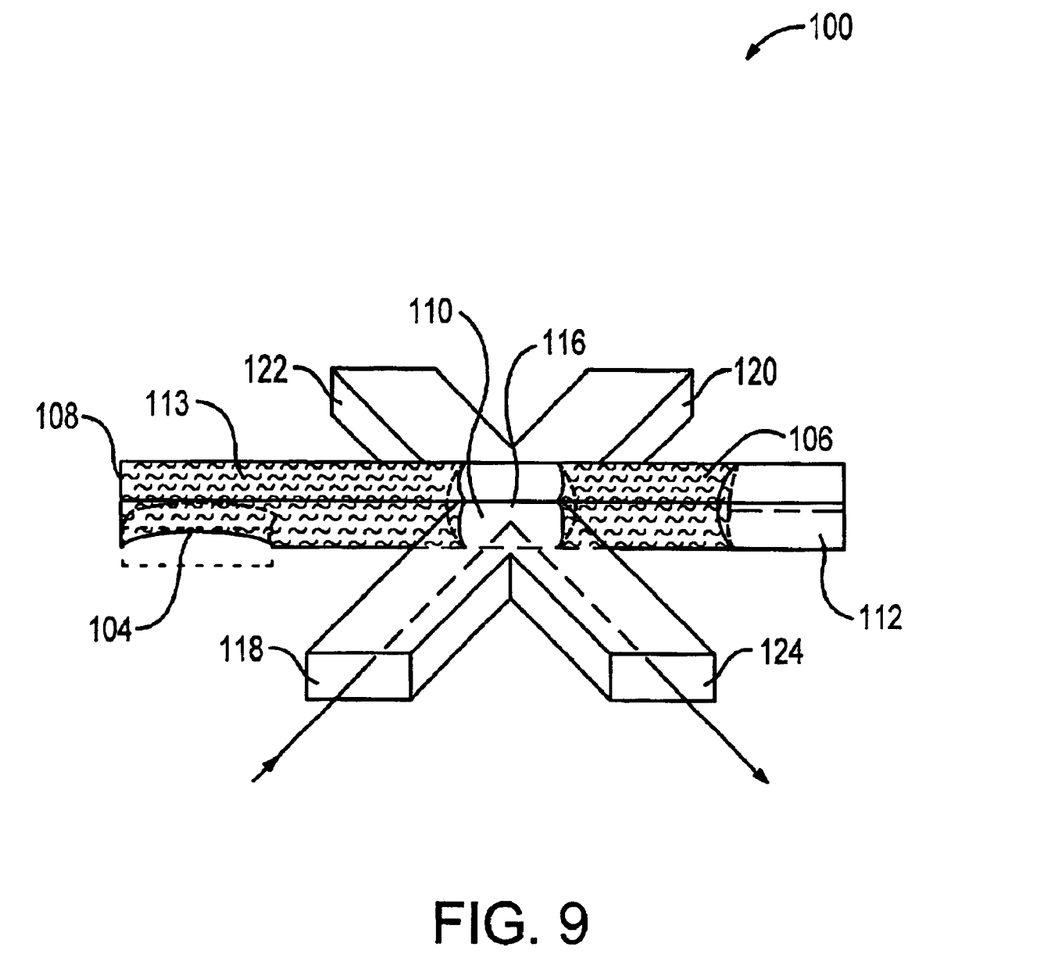
FIG. 9 is a perspective view of the optical switch of FIG. 8 in which the movable membrane is shown in a convex orientation.

With reference to FIGS. 6 and 9, the movable membrane 104 of the optical switch 100 is shown in a convex orientation. In this orientation, the liquid 113 is displaced in a direction away from the membrane. This is illustrated by the directional flow of the liquid 56, as indicated by the FIG. 6 arrows pointing in a direction away from the membrane 72. In FIG. 9, the displacement of the membrane to the convex orientation "pushes" the liquid 113, the first bubble 110, the liquid 106 and the second bubble 112 in a direction away from the membrane. During the displacement, the first bubble 110 that is near the membrane is "pushed" into the intersecting gap 116. Optical signals received by the first input waveguide segment 118 are diverted to the second output waveguide segment 124. Additionally, since the volume within the trench is reduced by an amount of displacement by the membrane while in the convex orientation, the first bubble 110 and the second bubble 112 are compressed.

Switching the movable membrane 104 back to the concave orientation of FIG. 8 allows an expansion of the volume within the liquid-filled trench 108 by an amount of displacement by the membrane, resulting in pressure relief to the compressed bubbles 110 and 112. Due to the additional volume, the second compressed bubble 112 within the trench that is farthest away from the membrane functions as a "mechanical spring" to "push" the liquid immediately adjacent to the bubble in a direction toward the membrane. The movement results in the displacement of the liquid 106 into the intersecting gap 116 and the first bubble 110 away from the gap. Displacing the liquid 106 into the gap allows the transmissions of optical signals along the first waveguide segments 118 and 120 and the second waveguide segments 122 and 124. The locations of the bubbles and the index-matching liquid in relation to the membrane while in a selected orientation is by no means meant to be limiting. That is, the bubbles and the liquid can be in different locations with the membrane being in the same location without diverging from the scope of the invention.

Figure 10:
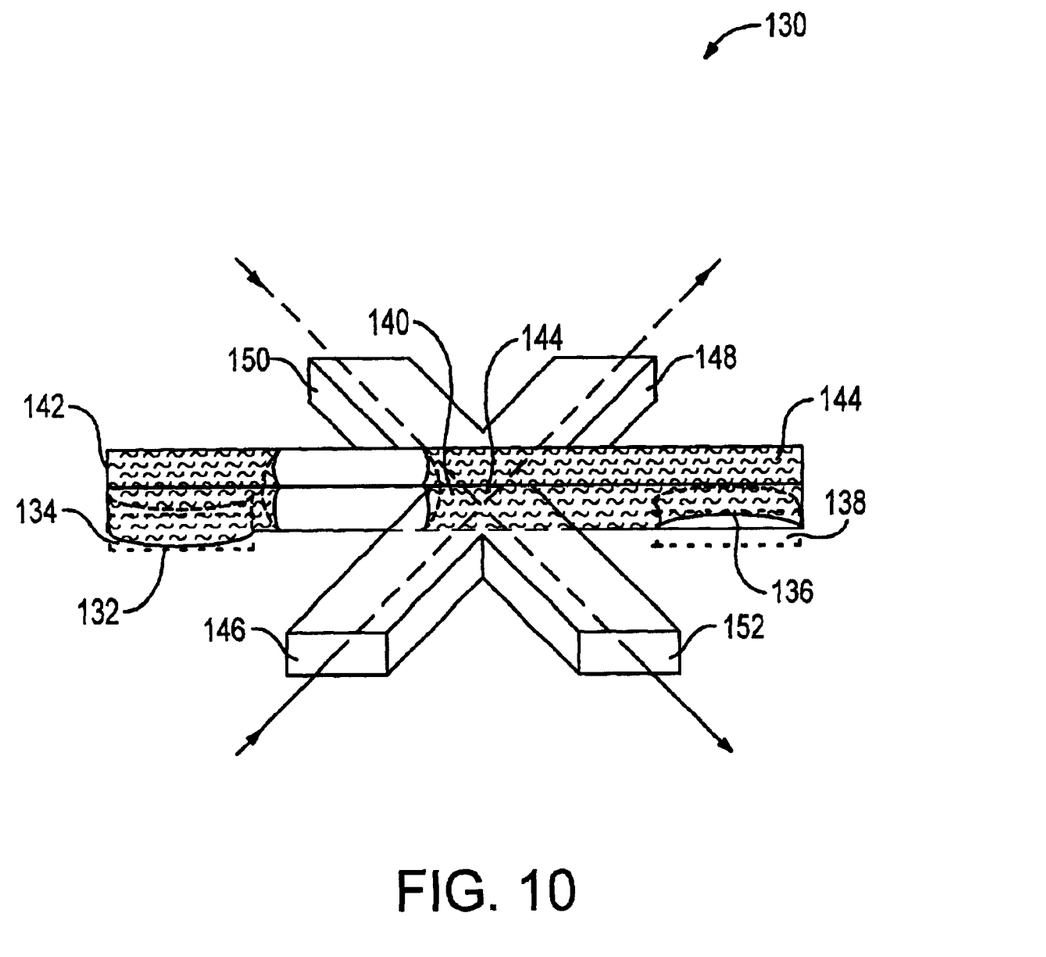
FIG. 10 is a perspective view of an optical switch of an alternative embodiment in accordance with the invention having two movable membranes in which a first membrane is in the concave orientation and a second membrane is in the convex orientation to devise a "push-pull" configuration.

With reference to FIG. 10, an optical switch 130 in accordance with a second embodiment of the invention is shown. The optical switch includes two piezoelectric actuators to devise a "push-pull" configuration. A first movable membrane 132 of a first piezoelectric actuator 134 is arranged on a side of an intersecting gap 140 opposite to a second movable membrane 136 of a second piezoelectric actuator 138. A liquid 144 partially fills a trench 142 and is disposed within the gap when the first membrane is in a concave orientation and the second membrane is in a convex orientation, such that optical transmissions from a first input waveguide segment 146 to a first output waveguide segment 148 and optical transmissions from a second input waveguide segment 150 to a second output waveguide segment 152 are enabled.

Figure 11:
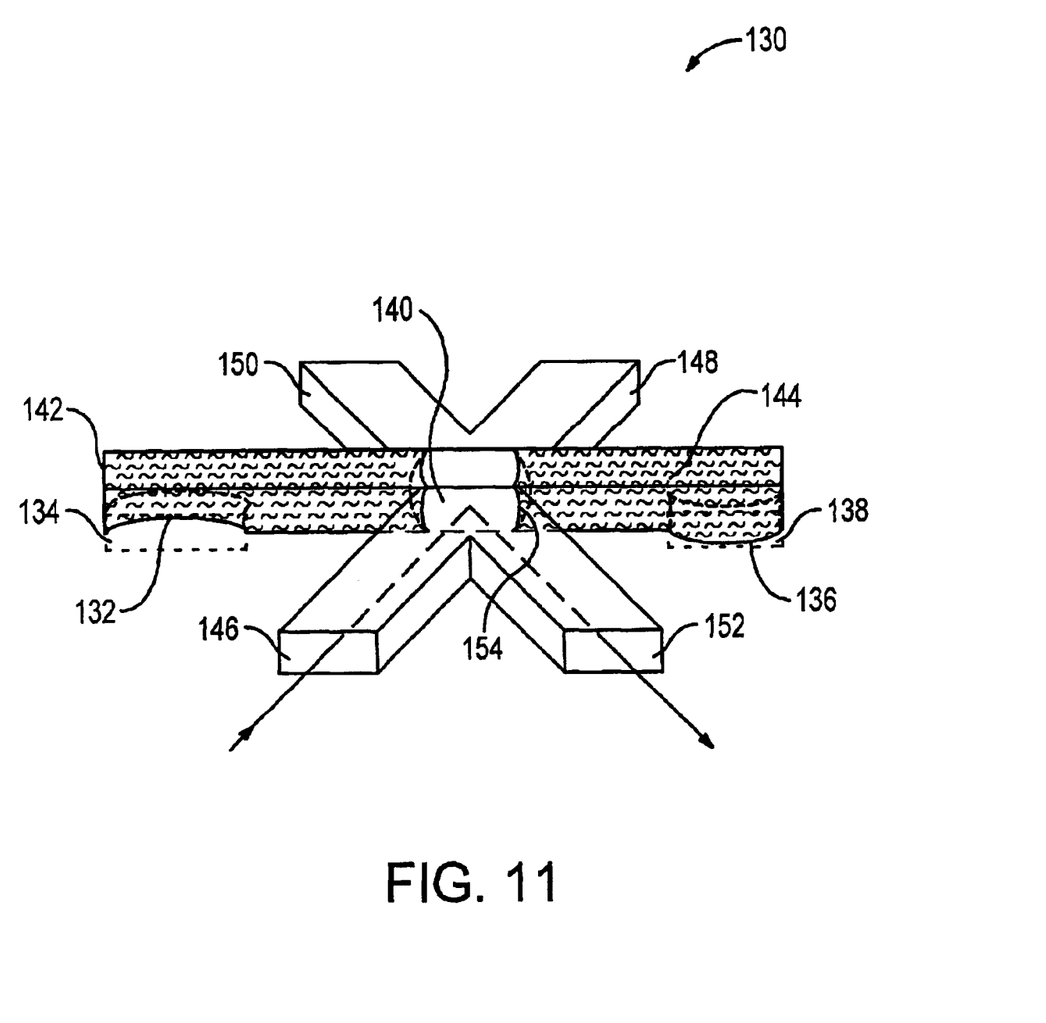
FIG. 11 is a perspective view of the optical switch of FIG. 10 in which the first membrane is in the convex orientation and the second membrane is in the concave orientation.

With reference to FIG. 11, the combination of the first membrane 132 being switched to the convex orientation and the second membrane 136 being switched to the concave orientation respectively "pushes" a gaseous bubble 154 in a direction toward the intersecting gap 140 and "pulls" the liquid 144 that was previously disposed within the gap away from the gap, resulting in TIR. Optical signals received from the first input waveguide segment 146 are diverted into the second output waveguide 152.

While the invention is described as using a membrane for manipulating the index-matching liquid within the gap, other types of actuators, such as a piston, can be used without diverging from the scope of the invention. Moreover, the trench may include a geometric constriction for holding the bubble at a fixed location within the trench once the bubble is displaced into that location by the movement of the membrane. In this arrangement, the level of input voltage to maintain the bubble at a particular location within the trench may be lessened. Alternatively, the trench is tapered at one end, such that the cross-sectional area at one end is smaller than the cross-sectional area at the other end.

Figure 12:
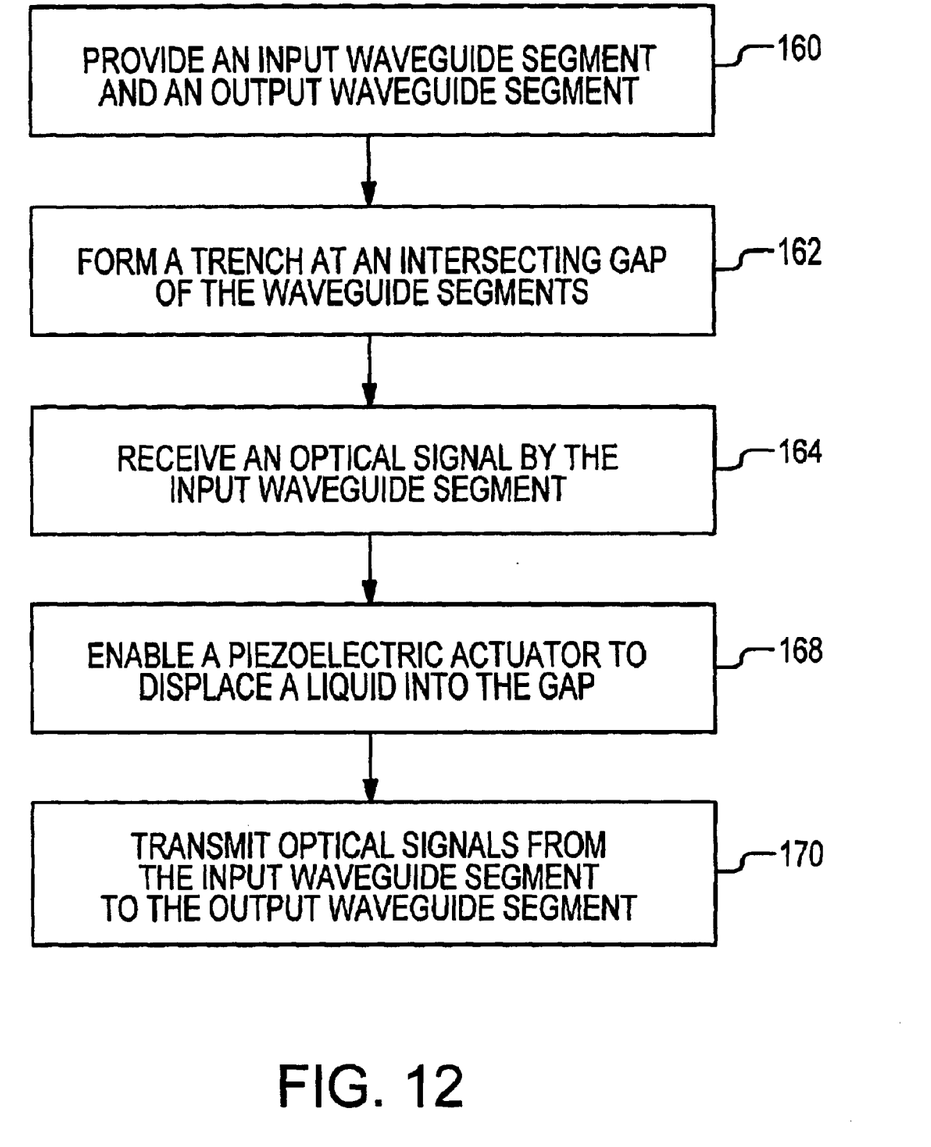
FIG. 12 is a method flow diagram for manipulating optical signals in an optical switch utilizing at least one movable membrane.

The method for manipulating optical signals in an optical switch utilizing at least one movable membrane is described with reference to the process flow diagram of FIG. 12. In step 160, a waveguide substrate having an input waveguide segment and an output waveguide segment is provided. In step 162, a trench is formed to provide an intersecting gap crossing the input and output waveguide segments. In step 164, an optical signal is received by the input waveguide segment. Subsequently, in step 168, a piezoelectric actuator is selectively enabled to displace a liquid relative to the gap. Presence of the liquid within the gap determines whether there is optical communication from the input waveguide segment to the output waveguide segment. Finally, in step 170, optical signals from the input waveguide segment to the output waveguide segment are transmitted in response to the presence of the liquid within the gap. While not shown, optical signals from the input waveguide segment are diverted away from the output waveguide segment when the piezoelectric actuator displaces the liquid away from the gap. Preferably, the diversion is in a direction of a second output waveguide segment.

What is claimed is:

1. A switching element comprising:
    a first actuator enabled for physical movement to selectively manipulate movement of a fluid within a gap; and
    a first optical waveguide and a second optical waveguide that intersect said gap such that optical communication from said first waveguide to said second waveguide is determined by a presence of said fluid within said gap, said fluid being selectively manipulated in response to said physical movement of said first actuator.

2. The switching element of claim 1 wherein said first actuator is configured for reciprocating movement and is positioned to determine fluidic communication within said gap, said fluid being selectively displaced when said first actuator is moved between first and second positions.

3. The switching element of claim 2 wherein said gap is defined by a trench having walls for containing said fluid within said gap, said first actuator positioned along one of said walls for displacing said fluid within said gap.

4. The switching element of claim 4 wherein said first actuator is a piezoelectrically driven actuator and includes a membrane that is configured to switch between an outward position and an inward position in relation to said wall.

5. The switching element of claim 4 wherein said membrane is coupled to a first electrode on a first side and a second electrode on a second side, said first side and said second side being on opposite sides of said membrane, said first electrode being coupled to a voltage source by a first electrical connection and said second electrode being coupled to said voltage source by a second electrical connection.

6. The switching element of claim 5 wherein said first electrical connection is provided on a side of said membrane opposite to said second electrical connection.

7. The switching element of claim 5 wherein said first electrical connection is provided on a same side of said membrane as said second electrical connection, said first electrical connection being coupled to said first electrode by a conductor.

8. The switching element of claim 4 wherein said membrane includes a stress-biased lead zirconia titanate (PZT) material.

9. The switching element of claim 2 wherein said reciprocating movement is made in response to applications of an input voltage, said first actuator being disposed to achieve volumetric variations with said reciprocating movement.

10. The switching element of claim 2 further comprising a second actuator, said second actuator and said first actuator being on opposing sides of said gap, wherein said second actuator is in fluidic communication with said gap, said fluid being selectively displaced when said second actuator is activated for said reciprocating movement.

11. The switching element of claim 1 wherein said fluid includes at least one of a liquid and a gas, said liquid having an index of refraction similar to an index of refraction of said first and second optical waveguides.

12. The switching element of claim 11 wherein said gas is one of an inert gas and a combination of inert gases, said gas being at least one of nitrogen, xenon, krypton, argon, neon, helium, carbon dioxide, and sulfur hexafluoride.

13. The switching element of claim 1 wherein said first and second waveguides are in optical communication when said fluid is present within said gap, said switching element further comprising a third optical waveguide intersecting said gap such that said first and third waveguides are in optical communication when said fluid is absent from said gap.

14. An optical switch comprising:
a first light-transmitting waveguide and a second light-transmitting waveguide having ends at an intersecting region, wherein optical transmission between said first and second waveguides is determined by a presence of a fluid within said intersecting region, said intersecting region being a portion of a trench having a plurality of surfaces for accommodating said fluid; and
a first electrically movable member in operative communication with said intersecting region via said fluid, said first electrically movable member being configured to move between a plurality of predetermined orientations for displacing said fluid relative to said intersecting region.

15. The optical switch of claim 14 wherein said first electrically movable member is positioned along one of said surfaces of said trench, said first electrically movable member being configured to move among a convex orientation, a concave orientation, and a relaxed orientation with respect to said one surface, said relaxed orientation being one in which a location of said first electrically movable member is generally aligned with an imaginary surface that extends along said one surface.

16. The optical switch of claim 15 wherein said first electrically movable member is configured to move between a first orientation and a second orientation, said first and second orientations being separate ones of said convex, concave and relaxed orientations.

17. The optical switch of claim 15 wherein said convex orientation displaces said fluid in a direction away from said first electrically movable member and said concave orientation enables said fluid to flow in a direction toward said first electrically movable member.

18. The optical switch of claim 15 wherein said first electrically movable member is a piezoelectric membrane in which an application of an electric potential displaces said piezoelectric membrane to one of said convex, concave and relaxed orientations.

19. The optical switch of claim 14 further comprising a second electrically movable member that is at an opposite side of said intersecting region from said first electrically movable member, said second electrically movable member being in operative communication with said intersecting region and being configured to move between one of said predetermined orientations for displacing said fluid relative to said intersecting region.

20. The optical switch of claim 19 wherein said fluid includes a bubble disposed in said trench, said bubble being selectively displaced into said intersecting region when said first electrically movable member is in a first predetermined orientation and said second electrically movable member is in a second predetermined orientation, said first and second predetermined orientations being dissimilar orientations.

21. The optical switch of claim 14 wherein said fluid includes a first bubble and a second bubble disposed in said trench, said first bubble being selectively displaced into said intersecting region when said first electrically movable member is in one of said predetermined orientations, said first and second bubbles being compressed when said first bubble is at said intersecting region.

22. A method for manipulating optical communication in an optical switch comprising:
providing an input waveguide and an output waveguide;
providing a trench at an intersecting gap of said input and output waveguides;
receiving an optical signal at said input waveguide;
enabling a piezoelectric actuator to switch between a plurality of configurations for displacing a fluid within said intersecting gap such that said optical communication from said input waveguide to said output waveguide is dependent upon a presence of said fluid within said intersecting gap; and
transmitting said optical signal from said input waveguide to said output waveguide.

23. The method of claim 22 wherein said step of enabling includes manipulating said piezoelectric actuator to switch among an outward configuration, an inward configuration and a flat configuration with respect to a surface of said trench, said piezoelectric actuator being in fluidic communication with said intersecting gap such that said fluid is displaced relative to said intersecting gap in response to said piezoelectric actuator being displaced to one of said outward, inward and flat configurations.

24. The method of claim 23 wherein said step of manipulating includes providing a piezoelectrically-driven membrane to switch among one of said outward, inward and flat configurations in response to voltage inputs.

25. A method for operating an optical switch comprising:
piezoelectrically actuating a first membrane to manipulate a change in volume of a fluid container such that a fluid disposed within said fluid container moves between a coupling position in which light from a first waveguide is received by a second waveguide and a noncoupling position in which light from a first waveguide is not received by said second waveguide.

26. The method of claim 25 further comprising reversing said movement of said fluid by piezoelectrically actuating said first membrane, resulting in a reversal of said change in said volume.

27. The method of claim 25 further comprising reversing said movement of said fluid by piezoelectrically actuating a second membrane.

* * * * *